United States Patent
Tan et al.

(10) Patent No.: US 11,335,348 B2
(45) Date of Patent: May 17, 2022

(54) INPUT METHOD, DEVICE, APPARATUS, AND STORAGE MEDIUM

(71) Applicant: Beijing Xiaomi Mobile Software Co., Ltd., Beijing (CN)

(72) Inventors: Jiefu Tan, Beijing (CN); Senhua Chen, Beijing (CN); Dan Li, Beijing (CN); Xinyi Ren, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 172 days.

(21) Appl. No.: 16/557,739

(22) Filed: Aug. 30, 2019

(65) Prior Publication Data

US 2020/0135205 A1 Apr. 30, 2020

(30) Foreign Application Priority Data

Oct. 24, 2018 (CN) .......................... 201811245352.8

(51) Int. Cl.
*G10L 15/26* (2006.01)
*G10L 15/08* (2006.01)
*G10L 25/54* (2013.01)
*G10L 25/63* (2013.01)

(52) U.S. Cl.
CPC ............ *G10L 15/26* (2013.01); *G10L 15/083* (2013.01); *G10L 25/54* (2013.01); *G10L 25/63* (2013.01); *G10L 2015/088* (2013.01)

(58) Field of Classification Search
CPC ....... G10L 15/00; G10L 15/26; G10L 15/083; G10L 25/00; G10L 25/54; G10L 25/63; G10L 2015/088
See application file for complete search history.

(56) References Cited

U.S. PATENT DOCUMENTS

| 5,761,641 A | 6/1998 | Rozak et al. |
| 2004/0102957 A1* | 5/2004 | Levin ............... G06F 40/58 704/3 |
| 2005/0144013 A1* | 6/2005 | Fujimoto ............ G10L 15/22 704/277 |

(Continued)

FOREIGN PATENT DOCUMENTS

| CN | 102323858 A | 1/2012 |
| CN | 104281252 A | 1/2015 |

(Continued)

OTHER PUBLICATIONS

Extended European Search Report dated Mar. 19, 2020 in European Patent Application No. 19196356.0, 12 pages.

(Continued)

*Primary Examiner* — Daniel C Washburn
*Assistant Examiner* — Sean E Serraguard
(74) *Attorney, Agent, or Firm* — Oblon, McClelland, Maier & Neustadt, L.L.P.

(57) ABSTRACT

The disclosure relates to a method, device, apparatus, and storage medium. The method includes recognizing voice data inputted by a user; obtaining a voice text corresponding to the voice data; obtaining, based on the voice text, a text to-be-input corresponding to the voice data, wherein the text to-be-input includes a plurality of words constituting a phrase or a sentence; and displaying the text to-be-input in an input textbox of an input interface.

9 Claims, 9 Drawing Sheets

(56) References Cited

U.S. PATENT DOCUMENTS

| | | | |
|---|---|---|---|
| 2007/0100619 A1* | 5/2007 | Purho | G06F 3/167 |
| | | | 704/239 |
| 2014/0095160 A1 | 4/2014 | Bao et al. | |
| 2014/0136198 A1 | 5/2014 | Bao et al. | |
| 2014/0163954 A1* | 6/2014 | Joshi | G06F 3/0237 |
| | | | 704/9 |
| 2017/0018272 A1* | 1/2017 | Lee | H04N 21/4532 |
| 2017/0337360 A1 | 11/2017 | Gaspard et al. | |
| 2018/0358005 A1* | 12/2018 | Tomar | G10L 15/22 |
| 2019/0332663 A1 | 10/2019 | Zhang et al. | |

FOREIGN PATENT DOCUMENTS

| | | |
|---|---|---|
| CN | 105895103 A | 8/2016 |
| CN | 103345467 B | 6/2017 |
| EP | 0 984 354 A2 | 3/2000 |
| EP | 3 483 745 A1 | 5/2019 |
| WO | WO 2018/014341 A1 | 1/2018 |

OTHER PUBLICATIONS

Combined Chinese Office Action and Search Report dated Apr. 17, 2020 in Chinese Patent Application No. 201811245352.8, 11 pages.
"Integrated Audio-graphics User Interface", IBM Technical Disclosure Bulletin. International Business Machines Corp., vol. 33 No. 11, Apr. 1, 1991, XP 000110434, pp. 368-371.
1st Office Action issued in European Patent Application No. 19196356.0 dated Dec. 16, 2021.

* cited by examiner

INPUT METHOD, DEVICE, APPARATUS, AND STORAGE MEDIUM

CROSS-REFERENCE TO RELATED APPLICATIONS

This application is based upon and claims priority to Chinese Patent Application No. 201811245352.8, filed Oct. 24, 2018, the entire contents of which are incorporated herein by reference.

TECHNICAL FIELD

The present disclosure relates to the field of information technology, and more particularly, to an input method, a device, an apparatus, and a storage medium.

BACKGROUND

With the rapid development of information technologies, voice interaction has become the most imaginative method of interaction in the future.

A user may input information by voice, for example, when the user enters a keyword in a search engine to search for a web page, or enters words in an instant messenger to communicate with other users, etc. Specifically, after the voice of the user is obtained, the voice may be converted into text, and the converted text may be used as input information. For instance, the converted text may be sent to other users for communication via the instant messenger.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method including recognizing voice data inputted by a user; obtaining a voice text corresponding to the voice data; obtaining, based on the voice text, a text to-be-input corresponding to the voice data, wherein the text to-be-input includes a plurality of words constituting a phrase or a sentence; and displaying the text to-be-input in an input textbox of an input interface.

In an example, when obtaining the text to-be-input, the method further includes determining, based on the voice text and corresponding relationships between different voice texts and target texts, whether the corresponding relationships include a target text that matches the voice text; when the corresponding relationships include the target text that matches the voice text, designating the target text as the text to-be-input; and when the corresponding relationships do not include the target text that matches the voice text, designating the voice text as the text to-be-input.

In another example, when determining whether the corresponding relationships include the target text that matches the voice text, the method further includes using the voice text and the corresponding relationships between the different voice texts and the target texts as an input of a matching algorithm to obtain an output of the matching algorithm; and determining, based on the output of the matching algorithm, whether the corresponding relationships include the target text that matches the voice text.

According to an aspect, the method further includes determining, based on the voice data, non-voice text information of the voice data; and selecting the matching algorithm corresponding to the voice data from a set of matching algorithms based on the non-voice text information, wherein using the voice text and the corresponding relationships between the different voice texts and the target texts as the input of the matching algorithm to obtain the output of the matching algorithm includes using the voice text and the corresponding relationships between the different voice texts and the target texts as the input of the matching algorithm corresponding to the voice data, to obtain the output of the matching algorithm.

In an example, the non-voice text information comprises at least one of emotion information, gender information, or age information.

According to an aspect, the method further includes obtaining state information of a terminal to which the user inputs the voice data, wherein using the voice text and the corresponding relationships between the different voice texts and the target texts as the input of the matching algorithm, to obtain the output of the matching algorithm includes using the state information of the terminal, the voice text, and the corresponding relationships between the different voice texts and the target texts as the input of the matching algorithm, to obtain the output of the matching algorithm.

Aspects of the disclosure also provide a terminal including a processor and a memory configured to store computer instructions executable by the processor. The processor is configured to recognize voice data inputted by a user; obtain a voice text corresponding to the voice data; obtain, based on the voice text, a text to-be-input corresponding to the voice data, wherein the text to-be-input includes a plurality of words constituting a phrase or a sentence; and display the text to-be-input in an input textbox of an input interface.

Aspects of the disclosure also provide a non-transitory computer-readable storage medium storing instructions that, when executed by one or more processors of a terminal, cause the terminal to recognize voice data inputted by a user; obtain a voice text corresponding to the voice data; obtain, based on the voice text, a text to-be-input corresponding to the voice data, wherein the text to-be-input includes a plurality of words constituting a phrase or a sentence; and display the text to-be-input in an input textbox of an input interface.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of devices and methods consistent with aspects related to the present disclosure as recited in the appended claims.

Figure 1:
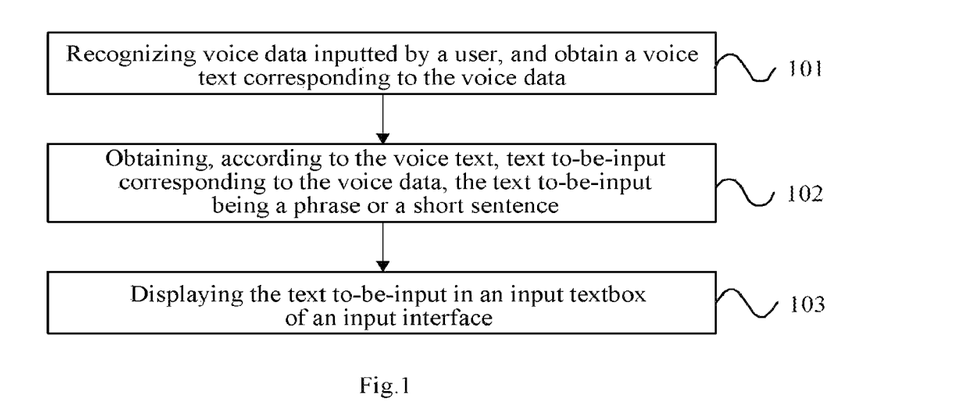
FIG. 1 is a block diagram illustrating an input method according to an exemplary aspect of the present disclosure.

FIG. 1 is a block diagram illustrating an input method according to an exemplary aspect. An executive body of the input method provided by this aspect may be a terminal such as a mobile phone, a tablet computer. As shown in FIG. 1, the method of this aspect may include the following steps:

In step 101, voice data inputted by a user is recognized, and a voice text corresponding to the voice data is obtained.

In this step, the voice data inputted by the user may be collected and obtained through an audio input device (for example, a microphone). Specifically, voice recognition may be performed on the voice data inputted by the user to obtain the voice text corresponding to the voice data. For example, when the user says "my mailbox", the terminal may obtain corresponding voice data by the microphone, and obtain the voice text corresponding to the voice data according to the voice data, i.e., the text of "my mailbox".

In step 102, a text to-be-input or a to-be-input text corresponding to the voice data is obtained according to the voice text, wherein the text to-be-input is a phrase or a short sentence.

In this step, the text to-be-input is text obtained according to the voice text and corresponding to the voice data. Optionally, the phrase may be specifically a subject-predicate phrase, a verb-object phrase, an endocentric phrase. The short sentence may be specifically a sentence having words a number of which is less than or equal to a specified threshold, for example, a sentence having words a number of which is less than or equal to 15. Wherein the text to-be-input may be text different from the voice text. For example, the voice text may be "my mailbox", and the text to-be-input may be "****@126.com". Here, the phrase or short sentence corresponding to the voice text is obtained according to the voice text, and input of a shortcut phrase or short sentence based on voice input may be realized.

In step 103, the text to-be-input is displayed in an input textbox of an input interface.

Figure 2A:
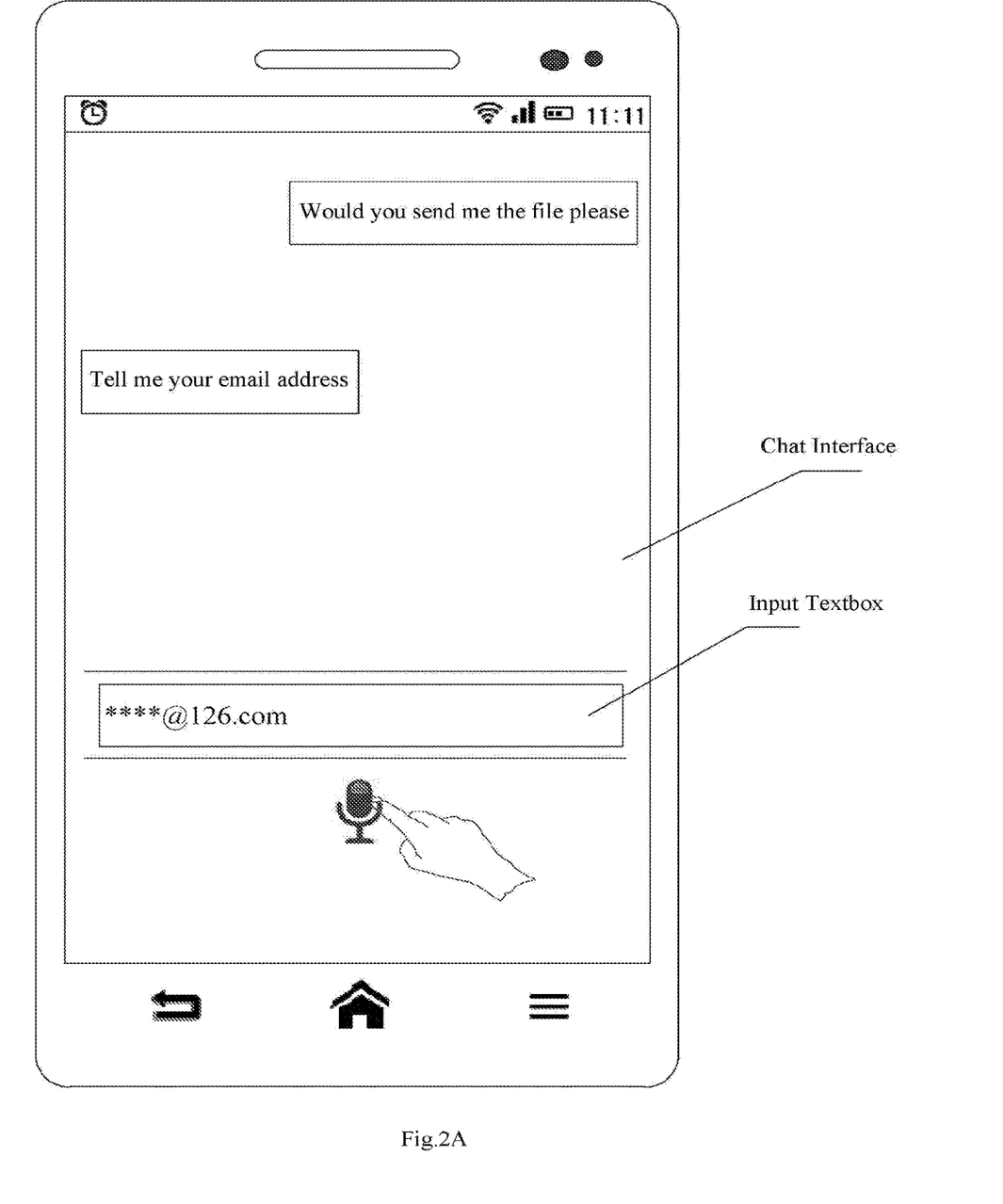
FIG. 2A is a schematic diagram illustrating an input interface according to an exemplary aspect of the present disclosure.

In this step, the text to-be-input is directly displayed in the input textbox of the input interface. For example, the input interface may be a chat interface, a search engine interface, or the like. An example, in which the input interface is the chat interface, and the user inputs a voice by clicking an icon of the microphone, and the text to-be-input is "****@126.com", is taken, and the display effect of the text to-be-input, which is displayed in the input textbox of the input interface, may be as shown in FIG. 2A, for example. Here, displaying the text to-be input in the input textbox of the input interface enables the user input the text to-be input more quickly and conveniently.

While in a related aspect, the user has to perform further selection operation to select the text in the candidate box, then the selected text may be displayed in the input textbox.

For example, in a first kind of related aspect, where a user selects to enter a shortcut input interface, and manually selects a phrase or a short sentence in a list of phrases and short sentences presented on a shortcut interface, to input the selected phrase or short sentence into an input interface.

As compared to the first kind of related aspect, the input method provided by this aspect reduces the user's selection operations and simplifies user input.

Figure 2B:
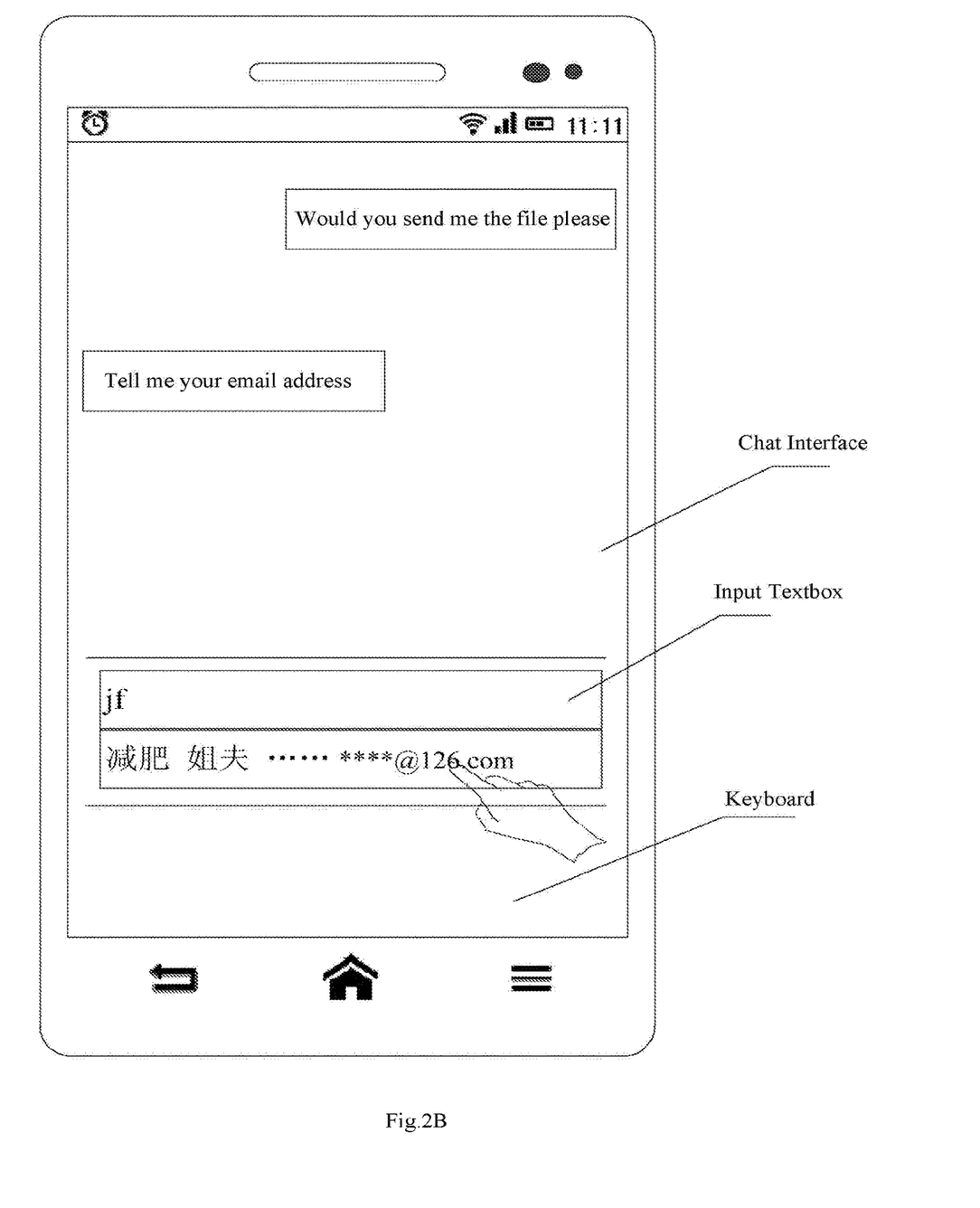
FIG. 2B is a schematic diagram illustrating an input interface in a related aspect of the present disclosure.

Another example relates to a second kind of related aspect, in which a text inputted by a user through a keyboard is obtained, and a candidate text (which may include a phrase or a short sentence corresponding to the text inputted by the user) corresponding to the text inputted by the user is displayed in a candidate box, and the text selected by the user in the candidate box is displayed in an input box. An example is taken in which the phrase or short sentence corresponding to "j f" is "**@126.com", and the text inputted by the user is "jf", the effect of displaying the candidate box in the input interface may be as shown in FIG. 2B, for example. The user has to complete the shortcut input of "@126.com" by selecting "**@126.com" in the candidate box.

As compared to the second kind of related aspect, the input method provided by this aspect reduces the user's selection operations and simplifies user input.

In the input method provided by this aspect, the voice data inputted by the user is recognized and the voice text corresponding to the voice data is obtained, the text to-be-input corresponding to the voice data is obtained according to the voice text, and the text to-be-input is displayed in the input textbox of the input interface, the text to-be-input is a phrase or a short sentence, so that a quick input based on voice input is realized, the user's input operations are simplified and a user experience is improved.

Figure 3:
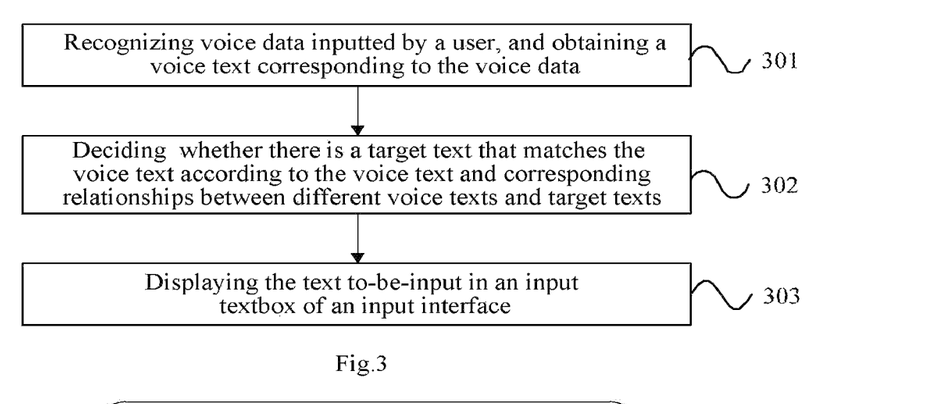
FIG. 3 is a block diagram illustrating an input method according to another exemplary aspect of the present disclosure.

FIG. 3 is a block diagram illustrating an input method according to another exemplary aspect. Referring to FIG. 3, the method provided by this aspect is based on the method as shown in FIG. 1, and mainly describes an optional implementation manner of obtaining text to-be-input corresponding to voice data according to the voice text. As shown in FIG. 3, the method in this aspect may include the following steps:

In step 301, voice data inputted by a user is recognized, and a voice text corresponding to the voice data is obtained.

It shall be noted that the step 301 is similar to the step 101, and details will not be elaborated herein.

In step 302, according to the voice text and corresponding relationships between different voice texts and target texts, it is decided whether there is a target text that matches the voice text.

Figure 4:
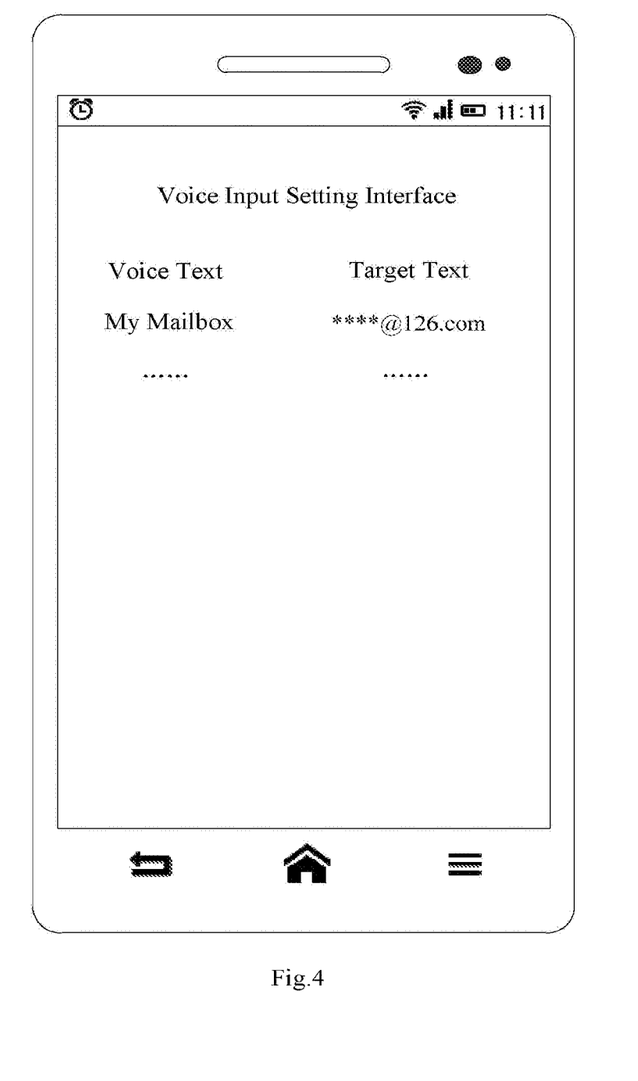
FIG. 4 is a schematic diagram illustrating a setting interface according to another exemplary aspect of the present disclosure.

In this step, the corresponding relationships may be corresponding relationships preset by a server, or may be corresponding relationships set by the user. Further, when the corresponding relationships are the corresponding relationships set by the user, a terminal may also send the corresponding relationships set by the user to the server, so that when using other terminals except for the terminal for voice input, the user may also perform a shortcut input based on the corresponding relationships. It should be noted that the present disclosure does not impose any limitation on a specific manner for setting the corresponding relationships by the user. For example, the user may establish an object relationship between the voice texts and the target texts in a setting interface as shown in FIG. 4.

Specifically, if there is a target text matching the voice text, the target text matching the voice text is decided as the text to-be-input; and if there is no target text matching the voice text, the voice text is decided as the text to-be-input.

In step 303, the text to-be-input is displayed in an input textbox of an input interface.

Figure 5:
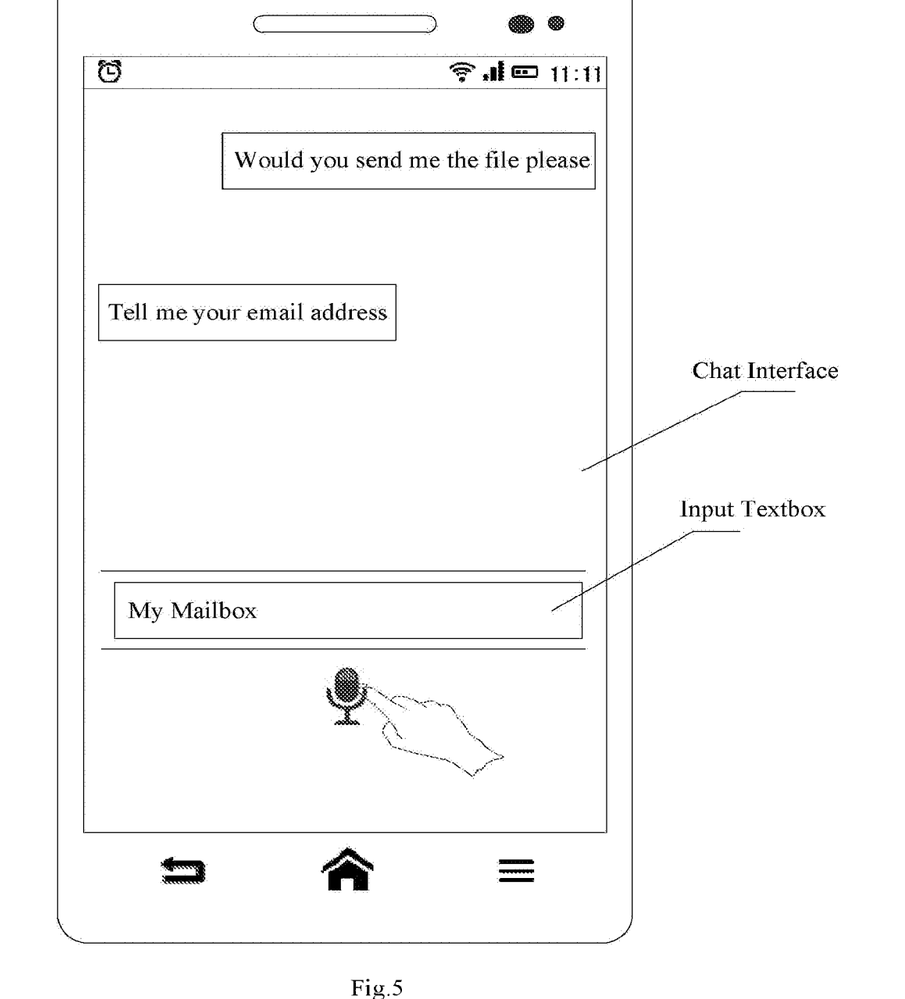
FIG. 5 is a schematic diagram illustrating an input interface according to another exemplary aspect of the present disclosure.

In this step, specifically, when it is decided in step 302 that there is a target text matching the voice text, the target text matching the voice text is displayed in the input interface. When it is decided in step 302 that there is no target text matching the voice text, the voice text is displayed in the input interface. An example is taken, in which the input interface is a chat interface, the voice text corresponding to the voice data, which is inputted by the user by clicking a microphone icon is "my mailbox", and the target text matching "my mailbox" is "****@126.com", the display effect of the text to-be-input displayed in the input textbox of the input interface may be as shown in FIG. 2, for example. An example is taken, in which the input interface is the chat interface, the voice text corresponding to the voice data, which is inputted by the user by clicking the microphone icon is "my mailbox", and there is no target text matching "my mailbox", the display effect of the text to-be-input, which is displayed in the input textbox of the input interface may be as shown in FIG. 5, for example.

Here, when there is a target text matching the voice text, the target text matching the voice text is displayed in the input textbox of the input interface, but when there is no target text matching the voice text, the voice text is displayed in the input textbox of the input interface, an implementation manner may be realized by causing the input of voice text in the input interface be compatible with the shortcut input of the phrase or short sentence based on the voice input.

In the input method provided by this aspect, it is decided whether there is a target text that matches the voice text according to the voice text and corresponding relationships between different voice texts and target texts; when there is a target text matching the voice text, the target text matching the voice text is displayed in the input textbox of the input interface, so that the quick input based on the voice input is realized, the user's input operations are simplified and a user experience is improved. In addition, when there is no target text matching the voice text, the voice text is displayed in the input textbox of the input interface, so that an implementation manner may be realized by causing the input of voice text in the input interface be compatible with the shortcut input of the phrase or short sentence based on the voice input.

Figure 6:
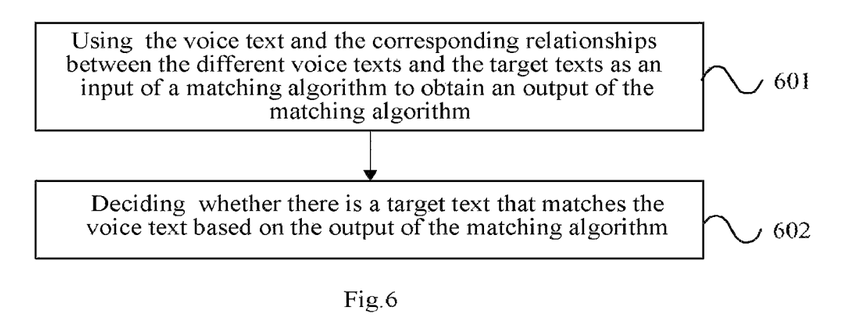
FIG. 6 is a block diagram illustrating an input method according to still another exemplary aspect of the present disclosure.

FIG. 6 is a block diagram illustrating an input method according to still another exemplary aspect. Referring to FIG. 6, the method provided by this aspect is based on the method as shown in FIG. 3, and mainly describes an optional implementation manner of deciding whether there is a target text matching the voice text. As shown in FIG. 6, the method in this aspect may include the following steps:

In step 601, the voice text and the corresponding relationships between the different voice texts and the target texts are used as an input of a matching algorithm to obtain an output of the matching algorithm.

In this step, the matching algorithm may be specifically a fuzzy matching algorithm or an exact matching algorithm. For example, it is supposed that the corresponding relationships include the corresponding relationship between the voice text "my mailbox" and the target text **@126.com, and when the matching algorithm is the exact matching algorithm, if the voice text corresponding to the voice data inputted by the user is "mailbox", the output of the matching algorithm may be NULL or an error code for indicating that there is no target text matching the voice text, and if the voice text corresponding to the voice data inputted by the user is "my mailbox", the output of the matching algorithm may be "@126.com"; and when the matching algorithm is the fuzzy matching algorithm, if the voice text corresponding to the voice data inputted by the user is "mailbox", the output of the matching algorithm may be "**@126.com".

Optionally, before the step 601, the method may further include: determining non-voice text information of the voice data according to the voice data, and selecting a matching algorithm corresponding to the voice data in a set of matching algorithms according to the non-voice text information. The voice data is the above-described voice data inputted by the user. The non-voice text information may be specifically one or more of information other than the voice text, which is obtained from the voice data. Optionally, the non-voice text information may include at least one of the following: emotion information, gender information, or age information.

The set of matching algorithms may include a plurality of matching algorithms. When the non-voice text information includes the emotion information, different emotions may correspond to different matching algorithms. When the non-voice text information includes the gender information, different genders may correspond to different matching algorithms. When the non-voice text information includes the age information, different age groups may correspond to different matching algorithms. Correspondingly, the step 601 may specifically include: using the voice text and the corresponding relationships between the different voice texts and the target texts as the input of the matching algorithm corresponding to the voice data, and obtaining the target text that matches the voice text. Here, the matching algorithm is selected according to the non-voice text information of the voice data, so that the corresponding matching algorithm may be selected for quick input of different voice text information, and the flexibility of the shortcut input is improved.

Optionally, the output of the matching algorithm may be related to state information of the terminal, wherein the state information herein may be, for example, location information, speed information, or the like. Correspondingly, the method in this aspect may further include: obtaining the state information of the terminal to which the user inputs the voice data. The step 602 may specifically include: using the state information of the terminal, the voice text, and the corresponding relationships between the different voice texts and the target texts as the input of the matching algorithm to obtain an output of the matching algorithm. Here, by using the state information of the terminal as the input of the matching algorithm, the flexibility of matching may be improved, thereby improving the flexibility of the quick input.

For example, it is supposed that the voice text corresponding to the voice data is "weather", and the corresponding relationships include the corresponding relationship between the voice text "weather" and the target text "current weather", and when the location information of the terminal is Beijing, the voice text "weather", the location information "Beijing" and the corresponding relationship are used as the input of the matching algorithm, to obtain the output of the matching algorithm, for example, "current weather in Beijing"; and when the location information of the terminal is "Shanghai", the voice text "weather", the location information "Shanghai" and the corresponding relationship may be used as the input of the matching algorithm, to obtain the output of the matching algorithm, for example, "current weather in Shanghai".

For example, it is supposed that the voice text corresponding to the voice data is "now", and the corresponding relationships include the corresponding relationship between the voice text "now" and the target text "I am now . . . ", and when the speed information of the terminal is 1 m/s, the voice text "now", the speed information "1 m/s" and the corresponding relationship may be used as the input of the matching algorithm, to obtain the output of the matching algorithm, for example, "I am walking now"; and when the speed information of the terminal is 2 m/s, the voice text "now", the speed information "2 m/s", and the corresponding relationship may be used as the input of the matching algorithm to obtain the output of the matching algorithm, for example, "I am running now".

In the step 602, based on the output of the matching algorithm, it is decided whether there is a target text that matches the voice text.

In this step, the output of the matching algorithm may indicate whether there is a target text that matches the voice text. For example, when the output of the matching algorithm is null, it may indicate that there is no target text that matches the voice text. For another example, when the output of the matching algorithm is non-null, it may indicate that there is a target text that matches the voice text.

In the input method provided by this aspect, the output of the matching algorithm is obtained by using the voice text and the corresponding relationships between the different voice texts and the target text as the input of the matching algorithm, and it is decided whether there is a target text matching the voice text according to the output of the matching algorithm, so that the decide of whether there is a target text that matches the voice text is realized.

Device aspects of the present disclosure will be described below, which may be used to implement the method aspects of the present disclosure. For details not disclosed in the device aspects of the present disclosure, please refer to the method aspects of the present disclosure.

Figure 7:
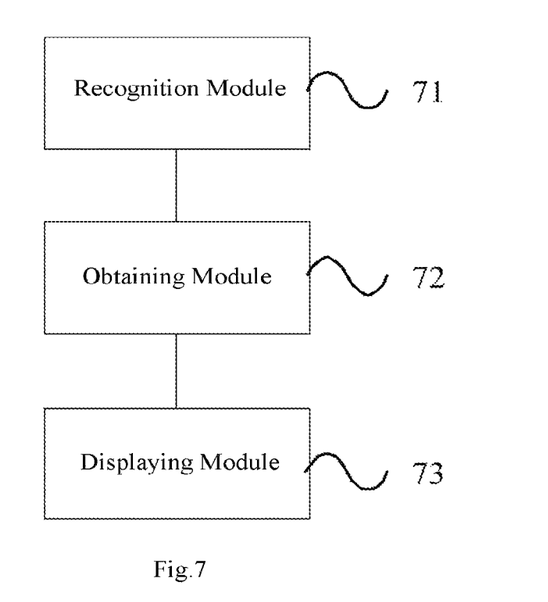
FIG. 7 is a block diagram illustrating an input device according to an exemplary aspect of the present disclosure.

FIG. 7 is a block diagram illustrating an input device according to an exemplary aspect. The device may be implemented as all or part of the terminal by software, hardware or a combination thereof. Referring to FIG. 7, the device includes a recognition module 71, an obtaining module 72, and a displaying module 73.

The recognition module 71 is configured to recognize voice data inputted by a user, and obtain a voice text corresponding to the voice data.

The obtaining module 72 is configured to obtain text to-be-input corresponding to the voice data according to the voice text, wherein the text to-be-input is a phrase or a short sentence.

The displaying module 73 is configured to display the text to-be-input in an input textbox of an input interface.

In summary, the input device provided by the aspects of the present disclosure recognizes the voice data inputted by the user through the recognition module, and obtains the voice text corresponding to the voice data, obtains the text to-be-input corresponding to the voice data according to the voice text through the obtaining module, and displays the text to-be-input in the input textbox of the input interface through the displaying module, and the text to-be-input is a phrase or a short sentence, so that the quick input based on voice input is realized, input operations of the user are simplified and a user experience is improved.

Figure 8:
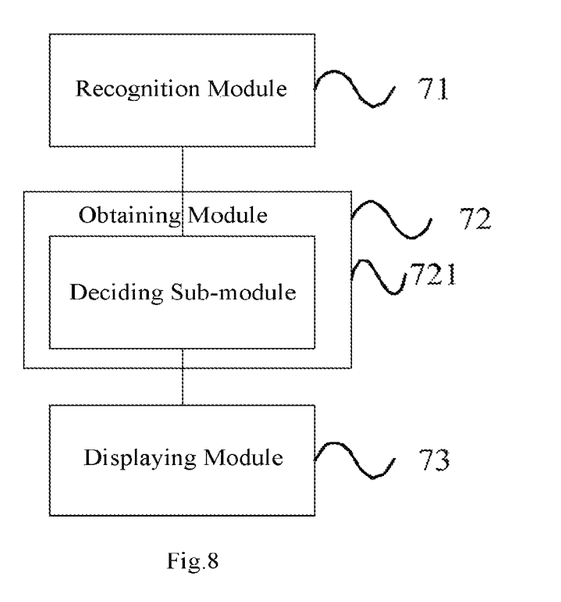
FIG. 8 is a block diagram illustrating an input device according to another exemplary aspect of the present disclosure.

FIG. 8 is a block diagram illustrating an input device according to another exemplary aspect. Referring to FIG. 8, the device is based on the block diagram illustrated in FIG. 7. Optionally, the obtaining module 72 may include a deciding sub-module 721.

The deciding sub-module 721 is configured to, according to the voice text and corresponding relationships between different voice texts and target texts, decide whether there is a target text that matches the voice text;

if there is a target text matching the voice text, the target text matching the voice text is decided as the text to-be-input; and if there is no target text matching the voice text, the voice text is decided as the text to-be-input.

In summary, the input device provided by the aspects of the present disclosure decides, through the deciding sub-module, whether there is a target text that matches the voice text according to the voice text and corresponding relationships between different voice texts and target texts; when there is a target text matching the voice text, the target text matching the voice text is displayed in the input textbox of the input interface, so that the quick input based on the voice input is realized, the user's input operations are simplified and a user experience is improved. In addition, when there is no target text matching the voice text, the voice text is displayed in the input textbox of the input interface, so that an implementation manner may be realized by causing the input of voice text in the input interface be compatible with the shortcut input of the phrase or short sentence based on the voice input.

Figure 9:
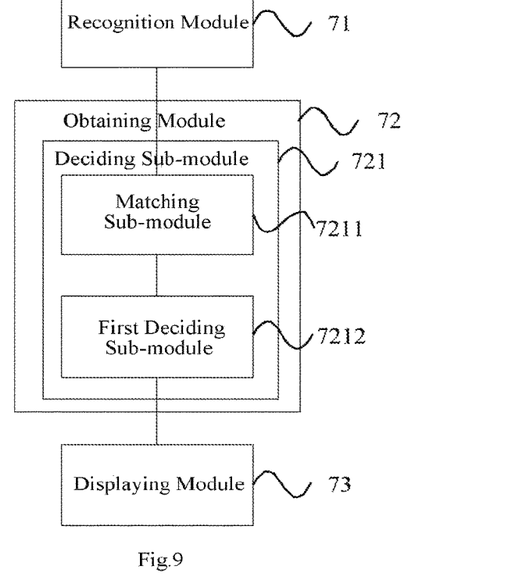
FIG. 9 is a block diagram illustrating an input device according to still another exemplary aspect of the present disclosure.

FIG. 9 is a block diagram illustrating an input device according to still another exemplary aspect. Referring to FIG. 9, the device is based on the block diagram shown in FIG. 8. Optionally, the deciding sub-module 721 includes a matching sub-module 7211 and a first deciding sub-module 7212.

The matching sub-module 7211 is configured to use the voice text and the corresponding relationships between the different voice texts and the target texts as an input of a matching algorithm to obtain an output of the matching algorithm.

The first deciding sub-module 7212 is configured to decide whether there is a target text matching the voice text according to the output of the matching algorithm.

In summary, in the input device provided by the aspects of the present disclosure, the output of the matching algorithm is obtained through the matching sub-module by using the voice text and the corresponding relationships between the different voice texts and the target texts as the input of the matching algorithm, and it is decided through the first deciding by deciding whether there is a target text matching the voice text according to the output of the matching algorithm, so that decide of whether there is a target text that matches the voice text is realized.

Figure 10:
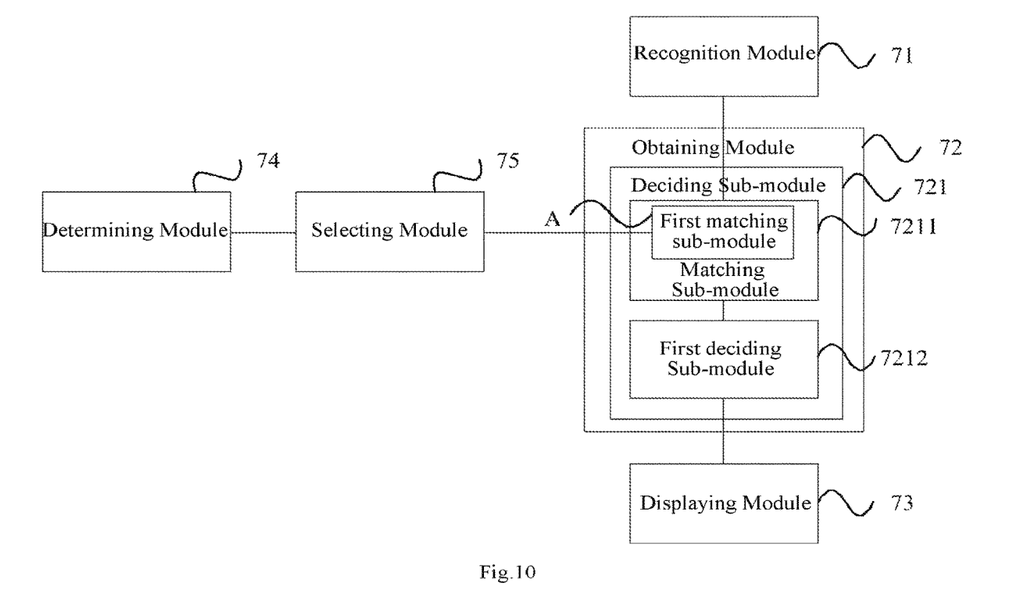
FIG. 10 is a block diagram illustrating an input device according to still another exemplary aspect of the present disclosure.

FIG. 10 is a block diagram illustrating an input device according to still another exemplary aspect. Referring to FIG. 10, the device is based on the block diagram shown in FIG. 9. Optionally, the device further includes a determining module 74 and a selecting module 75.

The determining module 74 is configured to, according to voice data, determine non-voice text information of the voice data.

The selecting module 75 is configured to select a matching algorithm corresponding to the voice data in a set of matching algorithms according to the non-voice text information.

The matching sub-module 7211 includes a first matching sub-module A configured to use the voice text and the corresponding relationships between the different voice texts and the target texts as an input of the matching algorithm corresponding to the voice data, to obtain an output of the matching algorithm.

In a possible implementation, the non-voice text information includes at least one of the following:

emotion information, gender information, or age information.

In summary, in the input device provided by the aspects of the present disclosure, the matching algorithm corresponding to the voice data in the set of matching algorithms is selected by the selecting module according to the non-voice text information, the voice text and the corresponding relationships between the different voice texts and the target texts is used by the first matching sub-module as the input of the matching algorithm corresponding to the voice data, to obtain the output of the matching algorithm, so that the corresponding matching algorithm may be selected for quick input of different voice text information, and the flexibility of the shortcut input is improved.

Figure 11:
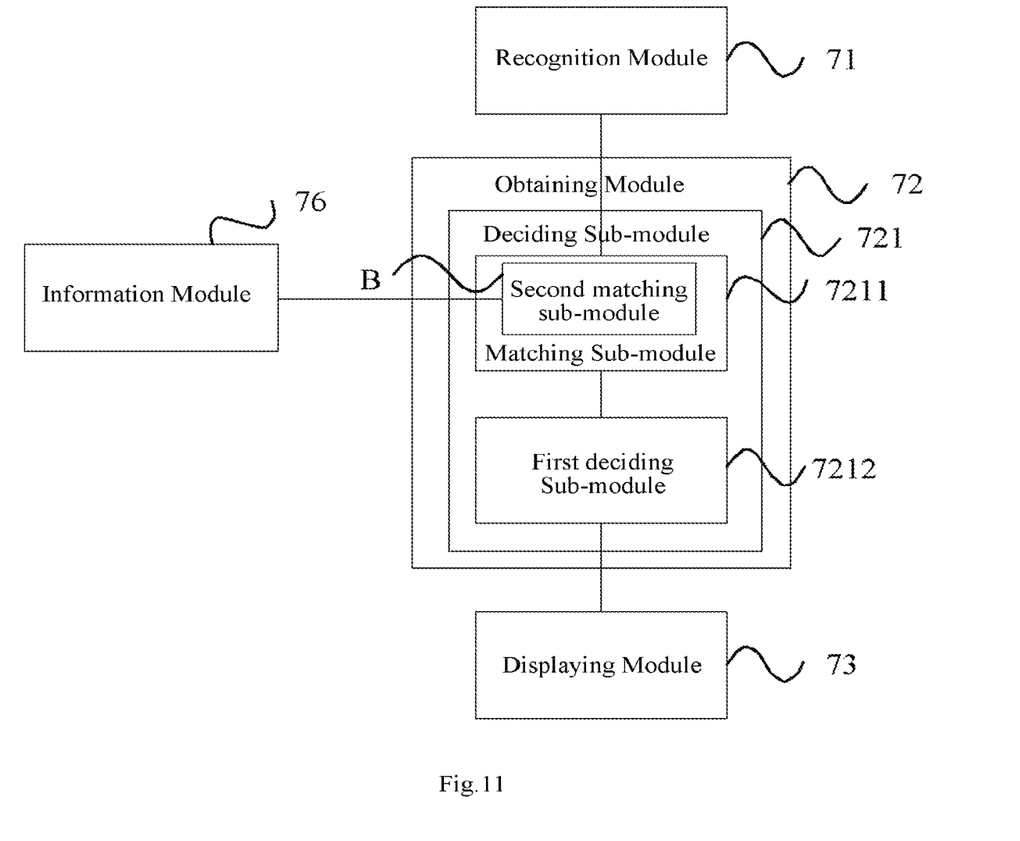
FIG. 11 is a block diagram illustrating an input device according to still another exemplary aspect of the present disclosure.

FIG. 11 is a block diagram illustrating an input device according to yet another exemplary aspect. Referring to FIG. 11, the device is based on the block diagram shown in FIG. 9, optionally, the device further includes an information module 76.

The information module 76 is configured to obtain state information of the terminal to which the user inputs the voice data.

The matching sub-module 7211 includes a second matching sub-module B configured to use the state information of the terminal, the voice text, and the corresponding relationships as an input of the matching algorithm to obtain an output of the matching algorithm.

In summary, in the input device provided by the aspects of the present disclosure, the information module obtains the state information of the terminal to which the user inputs the voice data, the second matching sub-module uses the state information of the terminal, the voice text, and the corresponding relationships as the input of the matching algorithm to obtain the output of the matching algorithm, so that it is realized that the state information of the terminal can be the input of the matching algorithm, thereby the flexibility of matching may be improved, and the flexibility of the quick input is improved.

With respect to the device in the above aspect, the specific manners for performing operations for individual modules therein have been described in detail in the aspects regarding the method, which will not be elaborated herein.

Figure 12:
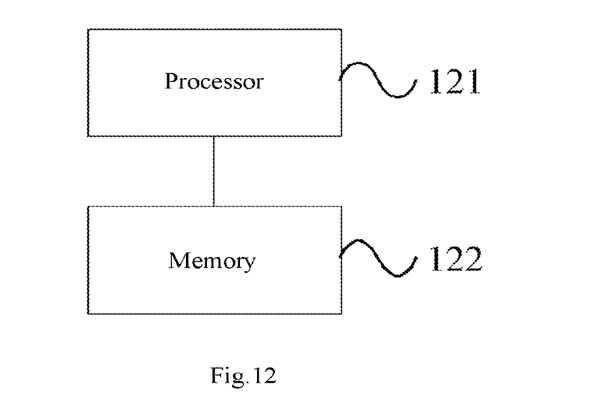
FIG. 12 is a block diagram illustrating a terminal according to still another exemplary aspect of the present disclosure.

FIG. 12 is a block diagram illustrating a terminal according to yet another exemplary aspect. As shown in FIG. 12, the terminal may include a processor 121 and a memory 122 for storing computer instructions.

The processor 121 executes the computer instructions to perform the following method:

recognizing voice data inputted by a user, and obtaining a voice text corresponding to the voice data;

obtaining, according to the voice text, text to-be-input corresponding to the voice data, wherein the text to-be-input is a phrase or a short sentence; and displaying the text to-be-input in an input textbox of an input interface.

In a possible implementation manner, the obtaining, according to the voice text, text to-be-input corresponding to the voice data includes:

deciding, according to the voice text and corresponding relationships between different voice texts and target texts, whether there is a target text that matches the voice text;

if there is a target text matching the voice text, the target text matching the voice text is the text to-be-input; and if there is no target text matching the voice text, the voice text is the text to-be-input.

In a possible implementation manner, the deciding, according to the voice text and corresponding relationships between different voice texts and target texts, whether there is a target text that matches the voice text includes:

using the voice text and the corresponding relationships between the different voice texts and the target texts as an input of a matching algorithm to obtain an output of the matching algorithm;

deciding, according to the output of the matching algorithm, whether there is a target text matching the voice text.

In a possible implementation manner, the method further includes:

determining, according to the voice data, non-voice text information of the voice data;

selecting a matching algorithm corresponding to the voice data in a set of matching algorithms according to the non-voice text information.

The using the voice text and the corresponding relationships between the different voice texts and the target texts as an input of a matching algorithm to obtain an output of the matching algorithm includes:

using the voice text and the corresponding relationships between the different voice texts and the target texts as the input of the matching algorithm corresponding to the voice data, to obtain the output of the matching algorithm.

In one possible implementation manner, the non-voice text information includes at least one of the following:

emotion information, gender information, or age information.

In a possible implementation manner, the method further includes:

obtaining state information of a terminal to which the user inputs the voice data;

The using the voice text and the corresponding relationships between the different voice texts and the target texts as the input of the matching algorithm, to obtain the output of the matching algorithm includes:

using the state information of the terminal, the voice text, and the corresponding relationships between the different voice texts and the target texts as the input of the matching algorithm, to obtain the output of the matching algorithm.

Figure 13:
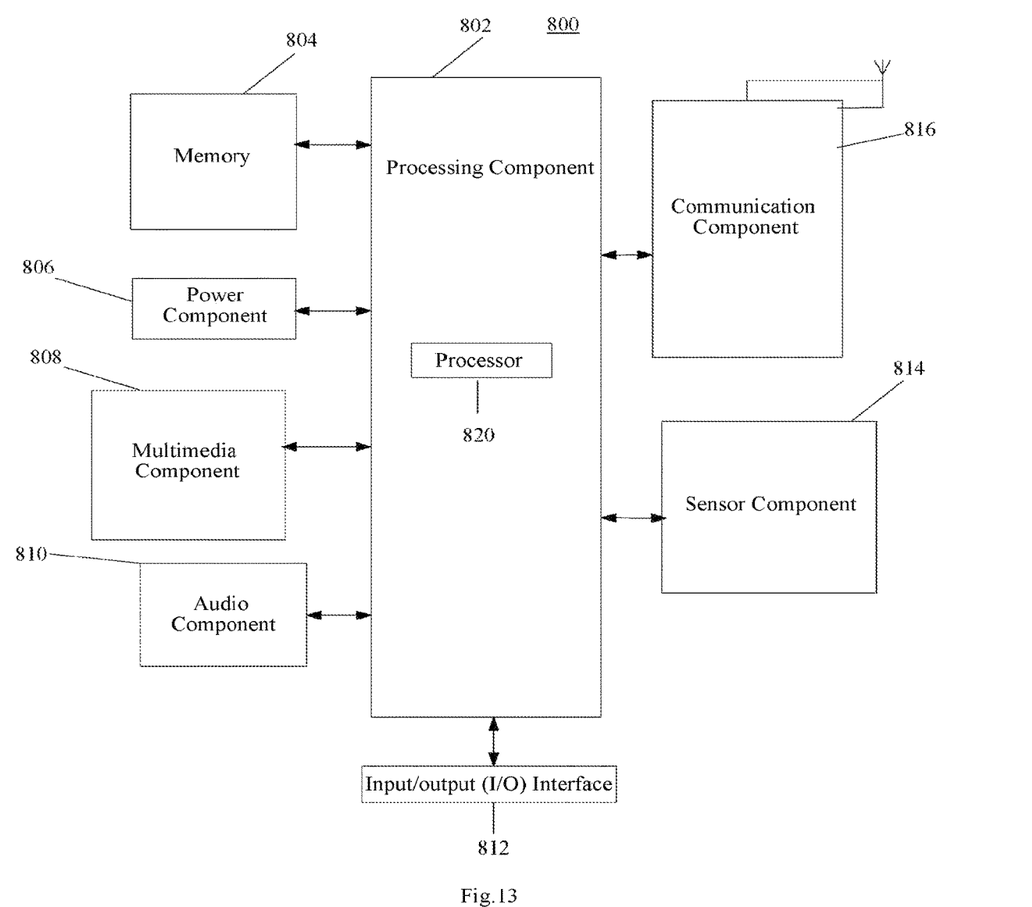
FIG. 13 is a block diagram illustrating a terminal 800 according to still another exemplary aspect of the present disclosure.

FIG. 13 is a block diagram illustrating a terminal 800 according to another exemplary aspect. For example, the terminal 800 may be a mobile phone, a computer, a digital broadcast terminal, a message transceiver device, a game console, a tablet device, a medical equipment, a fitness equipment, a personal digital assistant, and the like.

Referring to FIG. 13, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power for the terminal 800.

The multimedia component 808 includes a screen providing an output interface between the terminal 800 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some aspects, the multimedia component 808 includes a front camera and/or a rear camera. The front camera and/or the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules (such as a keyboard, a click wheel, buttons, and the like). The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some aspects, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as WiFi, 2G, or 3G, or a combination thereof. In one exemplary aspect, the communication component 816 receives a broadcast signal or broadcast associated information from an external broadcast management system via a broadcast channel. In one exemplary aspect, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary aspects, there is also provided a non-transitory computer-readable storage medium including instructions, such as the memory 804 including the instructions, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of a terminal, the terminal is enabled to perform an input method including:

recognizing voice data inputted by a user, and obtaining a voice text corresponding to the voice data;

obtaining, according to the voice text, text to-be-input corresponding to the voice data, wherein the text to-be-input is a phrase or a short sentence; and displaying the text to-be-input in an input textbox of an input interface.

In a possible implementation manner, the obtaining, according to the voice text, text to-be-input corresponding to the voice data includes:

deciding, according to the voice text and corresponding relationships between different voice texts and target texts, whether there is a target text that matches the voice text;

if there is a target text matching the voice text, the target text matching the voice text is the text to-be-input; and if there is no target text matching the voice text, the voice text is the text to-be-input.

In a possible implementation manner, the deciding, according to the voice text and corresponding relationships between different voice texts and target texts, whether there is a target text that matches the voice text includes:

using the voice text and the corresponding relationships between the different voice texts and the target texts as an input of a matching algorithm to obtain an output of the matching algorithm;

deciding, according to the output of the matching algorithm, whether there is a target text matching the voice text.

In a possible implementation manner, the method further includes:

determining, according to the voice data, non-voice text information of the voice data;

selecting a matching algorithm corresponding to the voice data in a set of matching algorithms according to the non-voice text information.

The using the voice text and the corresponding relationships between the different voice texts and the target texts as an input of a matching algorithm to obtain an output of the matching algorithm includes:

using the voice text and the corresponding relationships between the different voice texts and the target texts as the input of the matching algorithm corresponding to the voice data, to obtain the output of the matching algorithm.

In one possible implementation manner, the non-voice text information includes at least one of the following:

emotion information, gender information, or age information.

In a possible implementation manner, the method further includes:

obtaining state information of a terminal to which the user inputs the voice data;

The using the voice text and the corresponding relationships between the different voice texts and the target texts as the input of the matching algorithm, to obtain the output of the matching algorithm includes:

using the state information of the terminal, the voice text, and the corresponding relationships between the different voice texts and the target texts as the input of the matching algorithm, to obtain the output of the matching algorithm.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure, which follow the general principles thereof and include common knowledge as well as customary practice in the art that are not disclosed in present disclosure. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. An input method executed by a terminal, comprising:
recognizing voice data inputted by a user;
obtaining a voice text corresponding to the voice data;
obtaining state information of the terminal to which the user inputs the voice data;
obtaining, based on the voice text, a text to-be-input corresponding to the voice data, wherein the text to-be-input includes a plurality of words constituting a phrase or a sentence; and
displaying the text to-be-input in an input textbox of an input interface,
wherein obtaining the text to-be-input comprises:
  determining, based on the voice text and corresponding relationships between different voice texts and target texts, whether the corresponding relationships comprise a target text that matches the voice text, wherein the corresponding relationships are corresponding relationships set by a user;
  when the corresponding relationships comprise the target text that matches the voice text, designating the target text as the text to-be-input; and
  when the corresponding relationships do not comprise the target text that matches the voice text, designating the voice text as the text to-be-input,
wherein determining whether the corresponding relationships comprise the target text that matches the voice text further comprises:
  determining, based on the voice data, non-voice text information of the voice data;
  selecting a matching algorithm corresponding to the voice data from a set of matching algorithms based on the non-voice text information; and
  using the state information of the terminal, the voice text and the corresponding relationships between the different voice texts and the target texts as an input of the matching algorithm corresponding to the voice data, to obtain an output of the matching algorithm.

2. The method according to claim 1, wherein determining whether the corresponding relationships include the target text that matches the voice text comprises:
  determining, based on the output of the matching algorithm, whether the corresponding relationships include the target text that matches the voice text.

3. The method according to claim 1, wherein the non-voice text information comprises at least one of emotion information, gender information, or age information.

4. A terminal, comprising:
  a processor; and
  a memory configured to store computer instructions executable by the processor,
  wherein the processor is configured to:
    recognize voice data inputted by a user;
    obtain a voice text corresponding to the voice data;
    obtain state information of the terminal to which the user inputs the voice data;
    obtain, based on the voice text, a text to-be-input corresponding to the voice data, wherein the text to-be-input includes a plurality of words constituting a phrase or a sentence; and
    display the text to-be-input in an input textbox of an input interface,
  wherein, when obtaining the text to-be-input, the processor is further configured to:
    determine, based on the voice text and corresponding relationships between different voice texts and target texts, whether the corresponding relationships comprise a target text that matches the voice text, wherein the corresponding relationships are corresponding relationships set by a user;
    when the corresponding relationships comprise the target text that matches the voice text, designate the target text as the text to-be-input; and
    when the corresponding relationships do not comprise the target text that matches the voice text, designate the voice text as the text to-be-input,
  wherein, when determining whether the corresponding relationships comprise the target text that matches the voice text, the processor is further configured to:
    determine, based on the voice data, non-voice text information of the voice data;
    select a matching algorithm corresponding to the voice data from a set of matching algorithms based on the non-voice text information; and
    use the state information of the terminal, the voice text and the corresponding relationships between the different voice texts and the target texts as an input of the matching algorithm corresponding to the voice data, to obtain an output of the matching algorithm.

5. The terminal according to claim 4, wherein, when determining whether the corresponding relationships include the target text that matches the voice text, the processor is further configured to:
  determine, based on the output of the matching algorithm, whether the corresponding relationships include the target text that matches the voice text.

6. The terminal according to claim 4 wherein the non-voice text information comprises at least one of emotion information, gender information, or age information.

7. A non-transitory computer-readable storage medium storing instructions that, when executed by one or more processors of a terminal, cause the terminal to:
  recognize voice data inputted by a user;
  obtain a voice text corresponding to the voice data;
  obtain state information of the terminal to which the user inputs the voice data;
  obtain, based on the voice text, a text to-be-input corresponding to the voice data,
  wherein the text to-be-input includes a plurality of words constituting a phrase or a sentence; and
  display the text to-be-input in an input textbox of an input interface,
  wherein, when obtaining the text to-be-input, the instructions further cause the terminal to:
    determine, based on the voice text and corresponding relationships between different voice texts and target texts, whether the corresponding relationships comprise a target text that matches the voice text, wherein the corresponding relationships are corresponding relationships set by a user;
    when the corresponding relationships comprise the target text that matches the voice text, designate the target text as the text to-be-input; and
    when the corresponding relationships do not comprise the target text that matches the voice text, designate the voice text as the text to-be-input,
  wherein, when determining whether the corresponding relationships comprise the target text that matches the voice text, the instructions further cause the terminal to:
    determine, based on the voice data, non-voice text information of the voice data;
    select a matching algorithm corresponding to the voice data from a set of matching algorithms based on the non-voice text information; and
    use the state information of the terminal, the voice text and the corresponding relationships between the different voice texts and the target texts as an input of the matching algorithm corresponding to the voice data, to obtain an output of the matching algorithm.

8. The non-transitory computer-readable storage medium according to claim 7, wherein, when determining whether the corresponding relationships include the target text that matches the voice text, the instructions further cause the terminal to:
  determine, based on the output of the matching algorithm, whether the corresponding relationships include the target text that matches the voice text.

9. The non-transitory computer-readable storage medium according to claim 7, wherein the non-voice text information comprises at least one of emotion information, gender information, or age information.

* * * * *